(12) United States Patent
Edelson et al.

(10) Patent No.: US 10,106,249 B2
(45) Date of Patent: Oct. 23, 2018

(54) METHOD OF OPERATING AIRCRAFT DRIVE TO MOVE AN AIRCRAFT UNDER ADVERSE GROUND CONDITIONS

(75) Inventors: Jonathan S. Edelson, Portland, OR (US); Isaiah W. Cox, Baltimore, MD (US); Neal Gilleran, Long Beach, CA (US); Scott Perkins, Kent, WA (US)

(73) Assignee: Borealis Technical Limited, Gibraltar (GI)

( * ) Notice: Subject to any disclaimer, the term of this patent is extended or adjusted under 35 U.S.C. 154(b) by 341 days.

(21) Appl. No.: 13/983,561

(22) PCT Filed: Feb. 3, 2012

(86) PCT No.: PCT/US2012/023840
§ 371 (c)(1),
(2), (4) Date: May 11, 2015

(87) PCT Pub. No.: WO2013/106643
PCT Pub. Date: Aug. 9, 2012

(65) Prior Publication Data
US 2016/0052624 A1 Feb. 25, 2016

Related U.S. Application Data

(60) Provisional application No. 61/439,579, filed on Feb. 4, 2011.

(51) Int. Cl.
*B64C 25/40* (2006.01)

(52) U.S. Cl.
CPC ........... *B64C 25/405* (2013.01); *Y02T 50/823* (2013.01)

(58) Field of Classification Search
CPC .................................................. B64C 25/405
See application file for complete search history.

(56) References Cited

U.S. PATENT DOCUMENTS

| | | | | |
|---|---|---|---|---|
| 1,531,588 A | * | 3/1925 | Williams, Jr. .......... | B64C 25/64 244/103 R |
| 2,606,726 A | * | 8/1952 | Henion ................... | B64C 25/50 244/103 R |
| 2,844,339 A | * | 7/1958 | Stroukoff ................ | B64C 25/66 114/274 |
| 3,565,150 A | * | 2/1971 | Carr ........................ | B60C 27/10 152/218 |
| 3,595,199 A | * | 7/1971 | Faxas ..................... | B63H 11/08 440/12.69 |
| 5,020,745 A | * | 6/1991 | Stetson, Jr. ............ | B64G 1/283 244/164 |
| 5,704,568 A | * | 1/1998 | Watts ..................... | B64C 25/50 244/50 |

(Continued)

*Primary Examiner* — Richard R Green

(57) ABSTRACT

A method is provided for restoring mobility to an aircraft equipped with at least one self-propelled drive wheel powered by a driver when the aircraft has been rendered immobile as a result of one or more wheel tires adhering to and becoming stuck to tarmac or another ground surface. The method uses forces generated by the cooperative action of the wheel driver, the aircraft steering, and the aircraft braking system to release adherent tires of each set of main wheels and/or nose gear wheels by applying differential force to one set of wheels at a time to release any adherent tires so that the aircraft is able to move on the ground surface and travel in a desired direction at a desired speed.

9 Claims, 1 Drawing Sheet

(56) References Cited

U.S. PATENT DOCUMENTS

| | | | | |
|---|---|---|---|---|
| 6,657,334 B1* | 12/2003 | Edelson | ............... | H02K 3/28 310/166 |
| 6,838,791 B2* | 1/2005 | Edelson | ............... | H02K 3/28 310/49.35 |
| 7,034,257 B2* | 4/2006 | Petrenko | ............. | A63C 1/30 219/201 |
| 7,116,019 B2* | 10/2006 | Edelson | ............... | H02K 3/28 318/400.01 |
| 7,226,018 B2* | 6/2007 | Sullivan | ............... | B60L 7/26 244/111 |
| 7,237,748 B2* | 7/2007 | Sullivan | ............... | B60L 7/26 244/111 |
| 7,302,333 B2* | 11/2007 | Steen | ................. | B60K 28/16 180/197 |
| 7,469,858 B2* | 12/2008 | Edelson | ............... | F16H 3/56 244/103 S |
| 7,743,653 B2* | 6/2010 | Stommel | ............ | B60C 11/00 152/152.1 |
| 8,403,259 B2* | 3/2013 | Charuel | ............ | B64C 25/405 244/103 S |
| 8,955,793 B2* | 2/2015 | Sullivan | ............... | B60L 7/26 244/111 |
| 2004/0195442 A1* | 10/2004 | Yoshioka | ........... | B64C 25/001 244/104 CS |
| 2005/0224642 A1* | 10/2005 | Sullivan | ............... | B60L 7/26 244/111 |
| 2005/0235765 A1* | 10/2005 | Herbster | ......... | B60W 30/18045 74/336 R |
| 2005/0273239 A1* | 12/2005 | Turner | ............. | B60T 8/1755 701/70 |
| 2006/0038068 A1* | 2/2006 | Sullivan | ............... | B60L 7/26 244/111 |
| 2006/0065779 A1* | 3/2006 | McCoskey | ............. | B64F 1/32 244/100 R |
| 2006/0237249 A1* | 10/2006 | Steen | ................. | B60K 28/16 180/198 |
| 2007/0074918 A1* | 4/2007 | Meyer | .................. | B60K 6/365 180/65.31 |
| 2007/0282491 A1* | 12/2007 | Cox | .................... | B64C 25/40 701/3 |
| 2008/0059053 A1* | 3/2008 | Cox | .................... | B64C 25/405 701/121 |
| 2008/0179146 A1* | 7/2008 | Sullivan | ............... | B60L 7/26 188/164 |
| 2008/0296429 A1* | 12/2008 | Edelson | ............... | B64F 1/22 244/50 |
| 2009/0114765 A1* | 5/2009 | Cox | .................... | B64C 25/40 244/50 |
| 2009/0218440 A1* | 9/2009 | Dilmaghani | .......... | B64C 25/405 244/50 |
| 2009/0261197 A1* | 10/2009 | Cox | .................... | B64C 25/36 244/50 |
| 2009/0294577 A1* | 12/2009 | Roques | ............... | B64C 25/40 244/50 |
| 2010/0006699 A1* | 1/2010 | Sullivan | ............... | B60L 7/26 244/111 |
| 2012/0168557 A1* | 7/2012 | Edelson | ............... | B64C 25/405 244/50 |
| 2012/0310452 A1* | 12/2012 | Hahn | ................. | B64C 25/50 701/16 |
| 2013/0112807 A1* | 5/2013 | Cox | .................... | B64C 25/36 244/50 |
| 2013/0214089 A1* | 8/2013 | Cox | .................... | B64C 25/405 244/50 |
| 2013/0240665 A1* | 9/2013 | Cox | .................... | B64C 25/405 244/50 |
| 2014/0061374 A1* | 3/2014 | Cox | .................... | B64C 25/405 244/50 |
| 2014/0309901 A1* | 10/2014 | Schneider | ............. | B60T 7/122 701/70 |
| 2015/0129713 A1* | 5/2015 | Cox | .................... | B64C 25/405 244/50 |
| 2015/0142388 A1* | 5/2015 | Metzger | ............... | B60T 8/1703 702/189 |
| 2015/0158579 A1* | 6/2015 | Cox | .................... | B64C 25/405 244/50 |
| 2015/0291166 A1* | 10/2015 | Mair | ............... | B60W 30/18045 701/68 |
| 2015/0291167 A1* | 10/2015 | Mair | ............... | B60W 30/18045 701/22 |
| 2015/0291168 A1* | 10/2015 | Mair | ............... | B60W 30/18045 701/1 |
| 2015/0291169 A1* | 10/2015 | Mair | ............... | B60W 30/18045 701/1 |
| 2015/0291170 A1* | 10/2015 | Mair | ............... | B60W 30/18045 701/1 |
| 2015/0329202 A1* | 11/2015 | Cox | .................... | B64C 25/50 244/103 S |
| 2016/0176515 A1* | 6/2016 | Sullivan | ............... | B60L 7/26 244/50 |
| 2016/0185351 A1* | 6/2016 | Jerger | ............... | B60W 50/12 701/56 |

* cited by examiner

METHOD OF OPERATING AIRCRAFT DRIVE TO MOVE AN AIRCRAFT UNDER ADVERSE GROUND CONDITIONS

PRIORITY

This application claims priority from U.S. Provisional Patent Application No. 61/439,579, filed Feb. 4, 2011, the disclosure of which is fully incorporated herein.

TECHNICAL INVENTION

The present invention relates generally to the operation of aircraft on the ground under adverse ground conditions and specifically to a method of moving, under adverse ground conditions, an aircraft equipped with a powered self-propelled drive wheel from a position where the aircraft is temporarily immobile to full mobility and movement.

BACKGROUND OF THE INVENTION

Arriving and departing aircraft must travel on the ground between landing and subsequent takeoff along runways and taxiways associated with an airport. Over time, the tarmac surface of a runway or taxiway can change as a result of rubber buildup from the application of aircraft brakes, paint used for marking, chemicals, and erosion of the tarmac material. These changes in the runway surface produce changes in the friction between the runway surface and the aircraft's tires. The presence of moisture, whether from rain, slush, snow, or ice, however, is a major factor in the degradation of runway surfaces. At a minimum, braking action is diminished, and a longer landing distance is required.

Aircraft tires may also become stuck to the runway surface under adverse ground conditions. The coefficient of runway friction or slipperiness, $\mu$, is theoretically 1 when the runway friction characteristics are 100%. For a runway with 0% friction characteristics, $\mu=0$. All other friction characteristics fall between 0% ($\mu=0$) and 100% ($\mu=1$). Most new runways have a coefficient of friction of about $\mu=0.6$ (60% friction characteristics). A coefficient of friction $\mu>0.4$ (greater than 40% friction characteristics) is generally considered to be good. The factors mentioned above all contribute to runway deterioration and decrease the coefficient of friction, affecting aircraft braking and landing distance. The presence of moisture, particularly in the form of snow or ice, can have a significant effect on the friction characteristics between an aircraft's tires and the runway surface. This can lead to a situation in which the frictional forces between the tire and the runway cannot be overcome by direct aircraft pressure, resulting in a stuck aircraft with one or more tires adhered to the runway surface.

When an aircraft is completely stopped and at rest on the ground, there are numerous factors in addition to friction characteristics that can make movement of the aircraft from this resting condition difficult, particularly in cold weather. For example, tires that are cold tend to become misshapen, making them harder to turn. When a tire has become flattened where it contacts the tarmac, the force required to move the aircraft includes the force needed to lift the aircraft over the misshapen tire. Aircraft tires can also become stuck to the tarmac when water freezes between the tire and the tarmac or through light adhesion between the tire and tarmac in drier conditions. In winter conditions, snow and slush buildup can exacerbate the situation. In addition, when the aircraft wheel bearings are cold, they are more resistant to movement than when the bearings are warm, adding an additional frictional force to be overcome. Under these conditions, the force required initially to move an aircraft from a resting condition to a moving condition can be much greater than the force required to keep the aircraft moving, once frictional forces and inertia have been overcome and movement has started.

Aircraft are most often n immobile after arrival, when they are parked at a gate or other docking structure. The time an aircraft is required to spend at a gate will depend, in part, on the turnaround schedule. Some aircraft have longer turnaround times than others. In inclement weather, especially when the temperatures are around freezing, the likelihood of ice forming between one of more of the aircraft tires and the tarmac can be quite high, causing the tires and, hence, the wheels to become stuck to the tarmac.

Methods and apparatus for reducing the adhesion between ice on a travel surface and an object traveling on the surface are known. U.S. Pat. No. 7,034,257 to Petrenko et al, for example, proposes a method to modify friction between an object and ice or snow that is suggested to be applicable to aircraft landing gear. This method employs a heating element to apply a pulse of thermal energy to melt ice at the interface of an object and the ice or snow. While this method may be effective in other applications, it involves having available additional equipment and additional ground personnel to use the equipment to free a parked aircraft stuck to ice and get the aircraft moving. U.S. Pat. No. 7,743,653 to Stommel describes a method of adapting tires of aircraft and other vehicles to travel surface conditions by changing the shape of the tire to increase or decrease contact between the tire and the travel surface, thereby increasing or decreasing friction between the tire and the travel surface, by raising or lowering tire pressure in response to a sensed travel situation. Stommel, however, does not even remotely suggest that this system would be effective or could be used in snow, ice, or other conditions to release an aircraft tire that has become stuck, directly or indirectly, to the travel surface.

An aircraft with one or more tires immobilized by ice presents challenges during push back when a tow vehicle or tug is used. The weight of the tug helps to apply sufficient force to overcome the frictional, inertial, and other forces keeping the aircraft stuck in the ice. Aircraft equipped with self-propelled drive wheels powered by electric drivers, such as the system disclosed in U.S. Patent Application No. 2009/0114765 to Cox et al, work very effectively to move aircraft on the ground without external-assistance under almost all environmental conditions. These systems, however, are functionally required to be small and lightweight and cannot apply the same force as a tug to free aircraft wheels stuck in ice. Increasing the size of the driver in a powered self-propelled aircraft wheel to provide more force directly to the wheel to overcome ice adhesion is not a viable solution because these systems must remain as small and lightweight as possible, in part to fit within the space allotted for an aircraft's landing gear.

It would be highly desirable to be able to fully utilize the benefits of a powered self-propelled aircraft drive wheel, particularly at push back, under all types of runway and environmental conditions, especially those which cause adhesion of the aircraft's tires to the tarmac. The prior art has not provided a method for operating a powered self-propelled aircraft drive wheel under adverse runway conditions which have caused one or more of the aircraft's tires to adhere directly or indirectly to the tarmac that employs the powered self-propelled drive wheel to release the aircraft tires and enable the aircraft to move.

SUMMARY OF THE INVENTION

It is a primary object of the present invention, therefore, to provide a method for operating a powered self-propelled aircraft drive wheel under adverse runway conditions which have caused one or more of the aircraft's tires to adhere directly or indirectly to the tarmac that employs the powered self-propelled drive wheel to release the aircraft tire and enable the aircraft to move.

It is another object of the present invention to provide a method for using a powered self-propelled aircraft drive wheel to effectively free an aircraft wheel tire that has become stuck directly or indirectly to the tarmac without increasing the size of the wheel driver.

It is a further object of the present invention to provide a method for releasing one or more aircraft tires stuck to the tarmac or to ice on the tarmac that uses the aircraft's steering in conjunction with the aircraft's powered self-propelled wheel driver to release a stuck tire.

It is yet another object of the present invention to provide a method for releasing an aircraft tire stuck directly or indirectly to the tarmac that uses the aircraft powered self-propelled driver wheel driver to apply differential force to the stuck wheel to release it.

It is yet a further object of the present invention to provide a method for utilizing the driver from a powered self-propelled aircraft drive wheel to release stuck aircraft tires that will not otherwise move under direct aircraft pressure.

In accordance with the aforesaid objects, a method is provided for operating a powered self-propelled aircraft drive wheel under adverse runway conditions which have caused one or more of the aircraft's tires from the main wheels or the nose wheels to adhere directly or indirectly to the tarmac that employs the aircraft powered self-propelled drive wheel to release the tire and enable the aircraft to move. The method uses the aircraft steering system to steer the aircraft, preferably by steering the nose wheels, in a first direction and then in a second direction, while powering and activating the wheel driver to move the aircraft in a forward or in a reverse direction during the steering maneuver to apply differential force to the one or more wheels, thereby releasing any tires stuck to the tarmac.

Other objects and advantages will be apparent from the following description, drawings, and claims.

DESCRIPTION OF THE INVENTION

Figure 1:
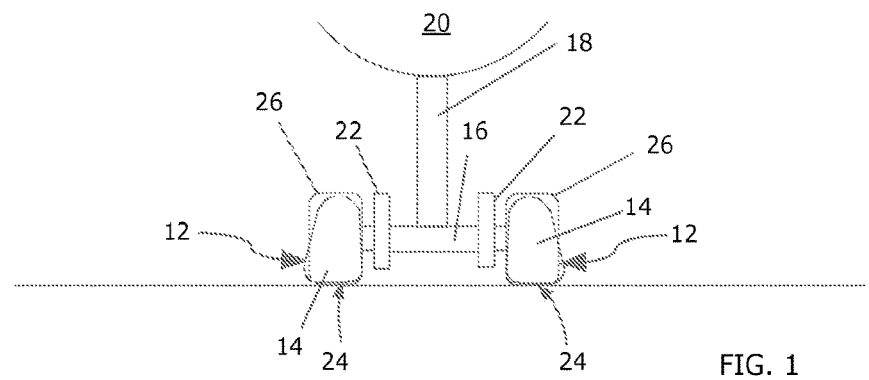
FIG. 1 illustrates a diagram of a set of powered aircraft self-propelled nose wheels showing deformation in the tires caused by adherence of the tire to the tarmac.

A powered self-propelled nose wheel or other powered aircraft drive wheel is uniquely positioned to maneuver an aircraft in a variety of circumstances on the ground without assistance from external vehicles. The driver for the powered drive wheel optimally exerts sufficient power to move the aircraft at runway speeds, and its small size enables the driver to fit within the landing gear space. When weather conditions and, hence, runway conditions are adverse, particularly when the weather is cold, icy, or snowy, it is not unusual for aircraft tires to adhere either directly to the tarmac or to ice formed by water freezing between the tire and tarmac surface. The method of the present invention uses a powered self-propelled nose wheel or other wheel driver in conjunction with the aircraft steering and, when indicated, the aircraft brakes to apply enough force to a stuck tire to release it from its stuck position, thereby enabling the aircraft to move on the ground in a desired direction.

An aircraft with a powered self-propelled nose wheel or other aircraft wheel will have one or more wheel drivers mounted in driving relationship with one or more of the aircraft wheels to move the wheels at a desired speed and torque. Wheel drivers useful for this purpose may be selected from those known in the art. One wheel driver preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of electric motor capable of driving an aircraft on the ground, including but not limited to electric induction motors, permanent magnet brushless DC motors, and switched reluctance motors, may also be used to power drive wheels in accordance with the present invention. Other motor designs capable of high torque operation across the speed range that can be integrated into an aircraft drive wheel to function as described herein may also be suitable for use in the aircraft ground movement system of the present invention. In addition, hydraulic pump/motor assemblies and pneumatic motors or other types of drivers known in the art could also be used to power an aircraft wheel that can be released when stuck to the tarmac according to the method of the present invention.

The direction of travel of the aircraft is typically controlled by the pilot steering the aircraft nose gear using an aircraft steering system, usually a hydraulic steering system. A nose wheel or other wheel driver may also be used to steer the aircraft, however, by varying the rotation and/or direction of rotation of each wheel in a pair of wheels to apply differential thrust between the wheels.

Referring to the drawings, FIG. 1 diagrammatically illustrates an aircraft nose gear 10 in which the tire shape has been deformed by one or more conditions, such as, for example, loss of tire pressure due to cold temperatures. The nose gear 10 includes a pair of wheels 12 on each of which is mounted a tire 14. The wheels 12 are rotatably mounted on an axle 16 supported by a strut 18 connected to the aircraft body 20. In the nose gear shown in FIG. 1, each one of a pair of nose wheel drivers 22 is mounted on the axle 16. Although the drivers 22 are shown mounted interiorly of the wheels 12 toward the strut 18, other mounting positions for the drivers 22 relative to the wheels are contemplated to be within the scope the present invention. Such positions and locations could include, for example without limitation, within a nose wheel or main wheel, within a nose wheel or main wheel landing gear space, or in any other convenient onboard location inside or outside the wheel. Additionally, although a pair of drivers 22 is shown mounted, with one adjacent to each wheel 12, a single driver may be mounted adjacent to a selected wheel to perform the method of the present invention. While the present invention is shown and described primarily with respect to the wheels of an aircraft nose landing gear, as indicated above, drivers 22 could be mounted to drive any one or more other aircraft wheels, including main landing gear wheels.

It can be seen in FIG. 1 that the tarmac contacting surface 24 of each tire 14 is deformed when compared to the optimum tire shape shown in dashed lines at 26. A misshapen tire is harder to turn, and the force required moving to move the aircraft must include the additional force needed to lift the aircraft over the misshapen tire.

As previously indicated, a tire stuck to the tarmac surface, either directly through light adhesion or indirectly through ice formed when water is present between the tire and the tarmac, is difficult to move and requires the correct application of force to release the tire without damaging the nose gear structures. Even if adhesion exists between only one tire, and/or possibly more sires tires, and the tarmac, all of the aircraft wheels must be operating to move the aircraft. Moreover, the stuck wheel or wheels could be any of the aircraft wheels, including the aircraft main gear wheels as well as the nose gear wheels. The method of the present invention enables a pilot to use a powered self-propelled wheel drive system, such as the nose wheel drive shown in FIG. 1 or a main wheel drive system (not shown), to free the stuck tire or tires and get the aircraft moving in all situations. A powered self-propelled wheel driver, whether mounted on the nose gear or elsewhere is uniquely suited to accomplish this.

Figure 2:
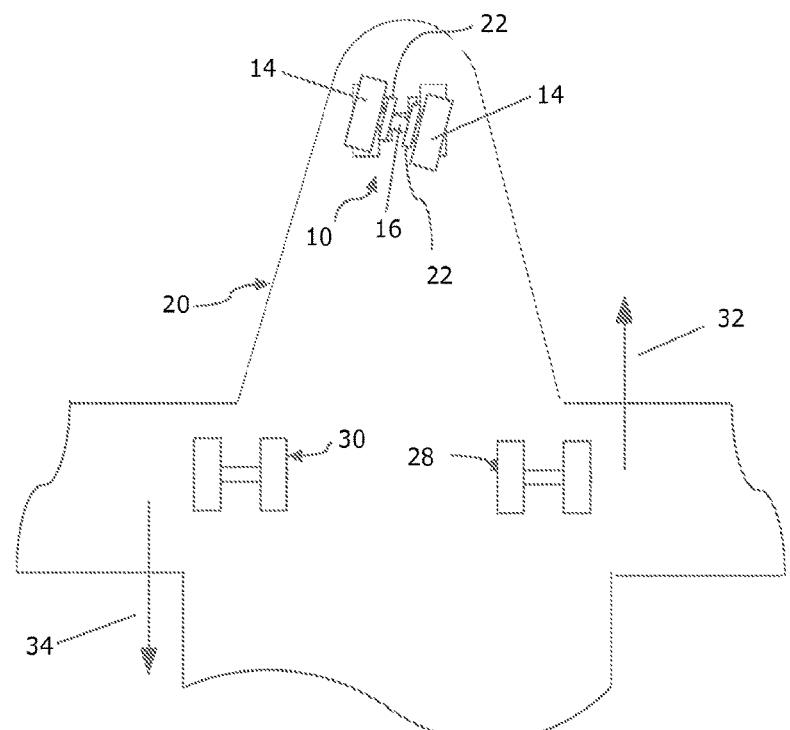
FIG. 2 illustrates a diagram of a set of powered aircraft self-propelled nose wheels and two sets of main wheels showing the differential forces applied to the wheels to move them from a condition of being stuck to the tarmac to being in motion.

When confronted with one or more aircraft wheels adhered to the tarmac, the pilot begins the maneuver to release the stuck wheel or wheels by initially steering the aircraft, preferably, but not necessarily, using the nose wheel steering, in a first direction and then in a second direction different from the first direction. The steering maneuver is accomplished by using either the aircraft hydraulic steering or by activating a wheel driver or drivers to produce differential thrust between the wheels. For example, turning the nose gear wheels in a first direction, as shown in FIG. 2, and then a second direction (not shown) will rotate the nose gear wheels away from the area of adhesion to the tarmac and release the adhesion between the tire and the tarmac. The pilot then activates the powered nose wheel driver or drivers 22, or other powered wheel driver, to move the aircraft forward or reverse while the nose wheel is steered to the right or to the left of center. This maneuver effectively applies differential force to one main wheel set 28 as compared to the second main wheel set 30. (FIG. 2) The net result is that the nose wheel driver does not have to overcome whatever frictional, inertial, or other forces are keeping all sets of the aircraft wheels in place so the aircraft is not moving. By steering the nose wheels in one direction and applying force with the nose wheel or another wheel driver, the driver can release one set of wheels at a time.

The maneuvers described above can be supplemented by the application of the aircraft brakes to whichever main wheel is not meant to be released, ensuring that full turning power is applied to just one set of main wheels, 28, 30. In an aircraft with a main wheel powered by an onboard driver like the nose wheel driver described above (not shown), the method of the present invention allows all available power to be focused on a single set of aircraft wheels. In an aircraft with the typical tricyclic landing gear configuration shown in FIG. 2, the application of the brakes to a wheel in a main wheel set (28, 30) and/or turning the nose gear steering can help concentrate the forces required to release one stuck wheel at a time. Additionally, differential force can be applied to each main wheel set (28, 30) in conjunction with turning the nose gear steering. For example, the right wheel set 28 can be driven forward, while the left set 30 can be driven backward, as indicated by the arrows 32 and 34, respectively. While this approach would turn the aircraft slightly, the maneuver will help rock the aircraft back and forth until the tires are successfully released, and the aircraft is able to move in the desired direction.

Although it should be apparent to the pilot and/or ground crew when one or more aircraft wheels are stuck because one or more tires has adhered to the tarmac, a sensor associated with each aircraft wheel or tire could be employed to relay information to the flight crew or ground crew confirming this. Devices that sense wheel rotation or movement and other wheel properties relating to wheel rotation or movement are known in the art and could be used with the present method.

It is also contemplated that the present method could be utilized in some runway excursion situations in which the aircraft has left the runway and one or more sets of aircraft wheels is stuck in the surface adjacent to the runway. The surface adjacent to the runway may be a variety of different materials, such as gravel, dirt or grass, and may be covered by snow or ice in the winter. Depending on the depth to which the wheel is stuck, the method described herein may effectively be used to free the aircraft wheel and move the aircraft back onto the tarmac. Additional similar uses are contemplated to be within the scope of the present method.

INDUSTRIAL APPLICABILITY

The method of the present invention will find its primary applicability for use with aircraft equipped with one or more powered self-propelled drive wheels, each having a driver that is activated to rotate and drive the powered wheel, to maneuver the aircraft from a resting position in which the aircraft has been rendered immobile by the adhesion of one or more tires to the runway or other surface to a fully mobile position in which the aircraft is capable of moving in a desired direction.

The invention claimed is:

1. A method for operating an aircraft moved on tarmac surfaces by powered self-propelled landing gear drive wheel-mounted motors when adverse tarmac surfaces and weather conditions cause tires mounted on the aircraft's landing gear wheels to be directly or indirectly adhered to the tarmac surfaces and render the aircraft immobile, comprising:

a. in an aircraft having a tricyclic arrangement of a pair of steerable nose landing gear wheels, two sets of main landing gear wheels located rearwardly of the pair of steerable nose landing gear wheels, tires mounted on the steerable nose landing gear wheels and on the main landing gear wheels in contact with tarmac surfaces, and brakes on the main landing gear wheels, mounting within each one of the pair of steerable nose landing gear wheels pilot-controllable powered self-propelled electric drive motors activatable to maneuver the aircraft on the tarmac surfaces;

b. when adverse tarmac surface or weather conditions cause one or more tires mounted on one set of the main landing gear wheels to be directly or indirectly adhered to the tarmac surface by an area of adhesion, to become misshapen, and to render the aircraft immobile, activating and controlling the powered self-propelled electric drive motors and rotating the steerable nose landing gear wheels away from the area of adhesion while steering the steerable nose landing gear wheels alternately in different directions, and causing one force to be applied to the one set of main landing gear wheels and a different force to be applied to the other set of main landing gear wheels, wherein the one force and the different force comprise a force required to lift the aircraft over the one or more misshapen main landing gear tires and move the aircraft on the tarmac surface; and c. releasing the one or more main landing gear tires from the area of adhesion with the tarmac surface with the applied force, and continuing to control the powered self-propelled electric motors and drive the mobility restored aircraft on the tarmac surface.

2. The method described in claim 1, further comprising applying brakes to the other set of main landing gear wheels without adherent tires to be released, applying full turning power to the one set of main landing gear wheels with the adherent one or more tires, and releasing the adherent one or more tires from the tarmac surface.

3. The method of claim 1, further comprising when a runway excursion has caused the aircraft to be immobilized on a ground surface off a runway and said one or more tires on the one set of main landing gear wheels are adhered to the ground surface off the runway, applying force to the one set of main landing gear wheels to release the one or more adherent tires, and driving the mobility restored aircraft back onto the runway by controlling the nose landing gear drive wheel-mounted powered self-propelled electric motors.

4. The method of claim 1, further comprising, when tires mounted on each of the two sets of main landing gear wheels is are adhered to the tarmac surface, simultaneously turning the pair of steerable nose landing gear wheels with the aircraft steering system, selectively powering each powered self-propelled nose landing gear drive wheel-mounted electric drive motor, applying a differential force to each one of the two sets of main landing gear wheels with the adhered tires, and releasing each adhered tire from the tarmac surface one at a time.

5. A method for operating an aircraft driven by nose landing gear wheel-mounted powered self-propelled drive motors to restore mobility to the aircraft under adverse tarmac surface conditions when tires mounted on the aircraft's nose landing gear wheels are adhered to the tarmac surface and the aircraft is stationary, comprising:

a. equipping an aircraft having a pair of steerable nose landing gear wheels, main landing gear wheels with brakes, and tires mounted on the nose and main landing gear wheels in contact with the tarmac surface with powered self-propelled electric drive motors mounted within each steerable nose landing gear drive wheel activatable and controllable by a pilot of the aircraft to maneuver the aircraft on a tarmac surface under adverse tarmac surface and weather conditions;

b. while the aircraft is driven on the tarmac surface and one or more tires mounted on the nose landing gear wheels become directly or indirectly adhered to the tarmac surface by an area of adhesion that renders the aircraft stationary, selectively activating and controlling each of the powered self-propelled nose landing gear wheel-mounted electric drive motors and moving the aircraft forward or reverse in conjunction with steering the steerable nose landing gear drive wheels to apply a differential force to release the adhered one or more tires from the area of adhesion with the tarmac surface, and moving the stationary aircraft; and c. continuing to drive the mobility restored aircraft with the pilot-controllable powered self-propelled electric drive motors on the tarmac surface under the adverse tarmac surface and weather conditions.

6. The method of claim 5, further comprising selectively controlling each one of the powered self-propelled electric drive motors to vary the rotation or direction of rotation of each steerable nose landing gear drive wheel, applying differential thrust between the pair of steerable nose landing gear drive wheels, and controlling direction of travel of the aircraft on the tarmac surface.

7. The method of claim 5, further comprising, when said one or more tires become misshapen as a result of adverse wet or icy tarmac conditions and cold temperatures and a portion of the one or more tires in contact with the adhesion area becomes flattened to form the area of adhesion, applying a force comprising force required to lift the aircraft over the misshapen tire to the steerable nose landing gear drive wheels supporting the one or more misshapen tires, and restoring mobility to the aircraft.

8. The method of claim 5, further comprising mounting powered self-propelled electric drive motors within the main landing gear wheels with brakes and when a tire mounted on one of the pair of nose landing gear drive wheels or a tire mounted on one of the main landing gear wheels adheres to the tarmac surface, directing power to and activating the powered self-propelled electric drive motors in the nose or main landing gear drive wheels with the adherent tires, driving the nose or main landing gear drive wheels with the adherent tires while applying brakes to main landing gear wheels with free, nonadherent tires, steering the nose landing gear wheels, and releasing the adherent tires.

9. The method of claim 5, further comprising activating and controlling the powered self-propelled electric drive motors to move the stationary aircraft at push back without assistance from external vehicles when the stationary aircraft is rendered immobile by one or more of the tires mounted on the nose or main landing gear wheels adhered to the tarmac surface by areas of adhesion, releasing the adhered one or more tires, and driving the aircraft with the powered self-propelled electric drive motors during push back.

\* \* \* \* \*